United States Patent [19]

Lin et al.

[11] Patent Number: 4,683,464

[45] Date of Patent: Jul. 28, 1987

[54] SAFETY MONITOR MEANS AND METHOD

[75] Inventors: Chew-Chen Lin, Houston; Winthrop K. Brown; Frank L. Lankford, Jr., both of Bellaire; Katherine L. Greenhill, Houston; Ronald L. Campsey, Alief, all of Tex.

[73] Assignee: Texaco Inc., White Plains, N.Y.

[21] Appl. No.: 821,711

[22] Filed: Jan. 23, 1986

Related U.S. Application Data

[63] Continuation of Ser. No. 509,106, Jun. 30, 1983, abandoned.

[51] Int. Cl.⁴ .................. G08B 13/26; G08B 21/00
[52] U.S. Cl. ........................... 340/685; 340/661; 324/72; 364/483; 343/872
[58] Field of Search ............... 340/661, 662, 685; 324/72; 364/481, 483, 550, 551; 343/872, 873

[56] References Cited

U.S. PATENT DOCUMENTS

| | | | |
|---|---|---|---|
| 3,745,549 | 7/1973 | Jepperson et al. | 340/685 |
| 3,786,468 | 1/1974 | Moffitt | 340/685 |
| 3,965,474 | 6/1976 | Guerrino et al. | 343/872 |
| 4,219,858 | 8/1980 | DePuy et al. | 364/483 |
| 4,398,188 | 8/1983 | Feigal et al. | 340/661 |
| 4,414,638 | 11/1983 | Talambiras | 364/481 |

*Primary Examiner*—S. Leon Bashore
*Assistant Examiner*—Andrew J. Anderson
*Attorney, Agent, or Firm*—Robert A. Kulason; James J. O'Loughlin; Ronald G. Gillespie

[57] ABSTRACT

A safety system and method, for use with apparatus having a conductive member where the apparatus changes the attitude and/or altitude of the conductive member during the operation of the apparatus, includes an antenna mounted on the conductive member which senses an electric field and provides an AC signal representative of the strength of the electric field. The peaks of the AC signal are averaged over several cycles to provide an average peak signal. A reference signal circuit derives the reference signal from either the average peak signal prior to the change in the member's attitude and/or altitude or while the member's attitude and/or altitude is changing. A control device connected to the averaging circuit and to the reference signal circuit prevents further changing of the conductive member's attitude and/or altitude in accordance with the average peak signal and the reference signal when the electric field strength is greater than a safe value.

12 Claims, 4 Drawing Figures

SAFETY MONITOR MEANS AND METHOD

CROSS REFERENCE TO RELATED APPLICATIONS

This application is a continuation as to all subject matter common to U.S. application Ser. No. 509,106, filed June 30, 1983, now abandoned, by C. C. Lin, W. K. Brown, F. L. Lankford, Jr., K. L. Greenhill and R. L. Campsey and assigned to Texaco Inc., assignee of the present invention, and a continuation-in-part for additional subject matter.

BACKGROUND OF THE INVENTION

Field of the Invention

The present invention relates to safety systems and methods in general and, more particularly, to a safety system and method for use with conductive members when used in the presence of power lines.

SUMMARY OF THE INVENTION

A safety system and method for use with apparatus having a conductive member where the apparatus changes the attitude and/or altitude of the conductive member during the operation of the apparatus includes an antenna mounted on the conductive member which senses an electric field and provides an AC signal representative of the strength of the electric field. The peak of the AC signal is averaged over several cycles to provide an average peak signal. A reference signal circuit derives the reference signal from either the average peak signal prior to the change in the member's attitude and/or altitude or while the member's attitude and/or altitude is changing. A control device connected to the averaging circuit and to the reference signal circuit prevents further changing of the conductive member's attitude and/or altitude in accordance with the average peak signal and the reference signal when the electric field strength is greater than a safe value.

The objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

DESCRIPTION OF THE INVENTION

There have been fatal accidents in the oil field with drilling and with well service groups dues to raising derricks and masts of drilling and workover rigs into electrical power lines. This safety problem is not unique to the oil industry but is also applicable to the other industries where devices such as cherry pickers used by power companies, tree surgeons, plus construction cranes and other conductive masts or devices, accidentally come in contact with power lines. Nor is the present invention restricted to devices located on trucks but is also applicable to a situation where a conductive member may be raised in the presence of a power line. A conductive member for purposes of the present invention is any member whose structure is conductive or whose structure is non-conductive but has other means of conduction such as wires and cables. The present invention provides a method of preventing this type of accident and at the same time warning the operator that the rig is in a hazaradous situation.

Figure 1:
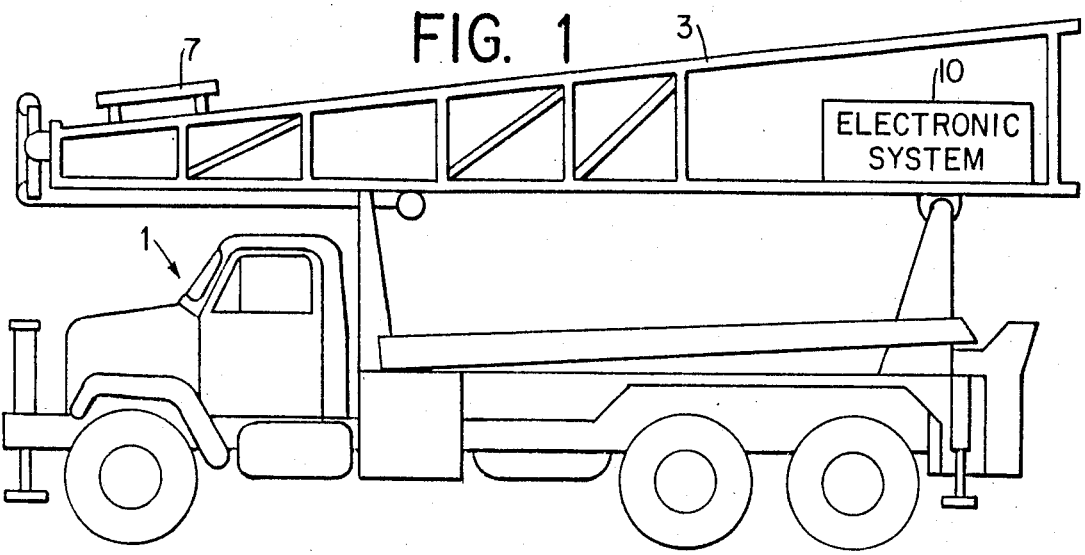
FIG. 1 is a pictorial representation of a truck mounted derrick having a safety system constructed in accordance with the present invention.

Referring now to FIG. 1, there is shown a typical service conductive member such as a derrick 3 mounted on a truck 1 which is raised to an operating position by conventional means. Located on derrick 3 is an antenna 7 which is electrically connected to an electronic system 10. Although only one antenna 7 is shown, it would be obvious to one skilled in the art to use multiple antennas with appropriate multiplexing and/or interfacing means, if so desired. As derrick 3 is raised during normal operation and it approaches power lines, antenna 7 will have a voltage induced by the electric field created by the power lines and provides a signal to electronic system 10. When the electric field is strong enough electronic system 10 will warn the operator, who is in the cab of truck 1, to stop the raising of derrick 3 and sound an alarm audibly and visibly as hereinafter explained.

Figure 2:
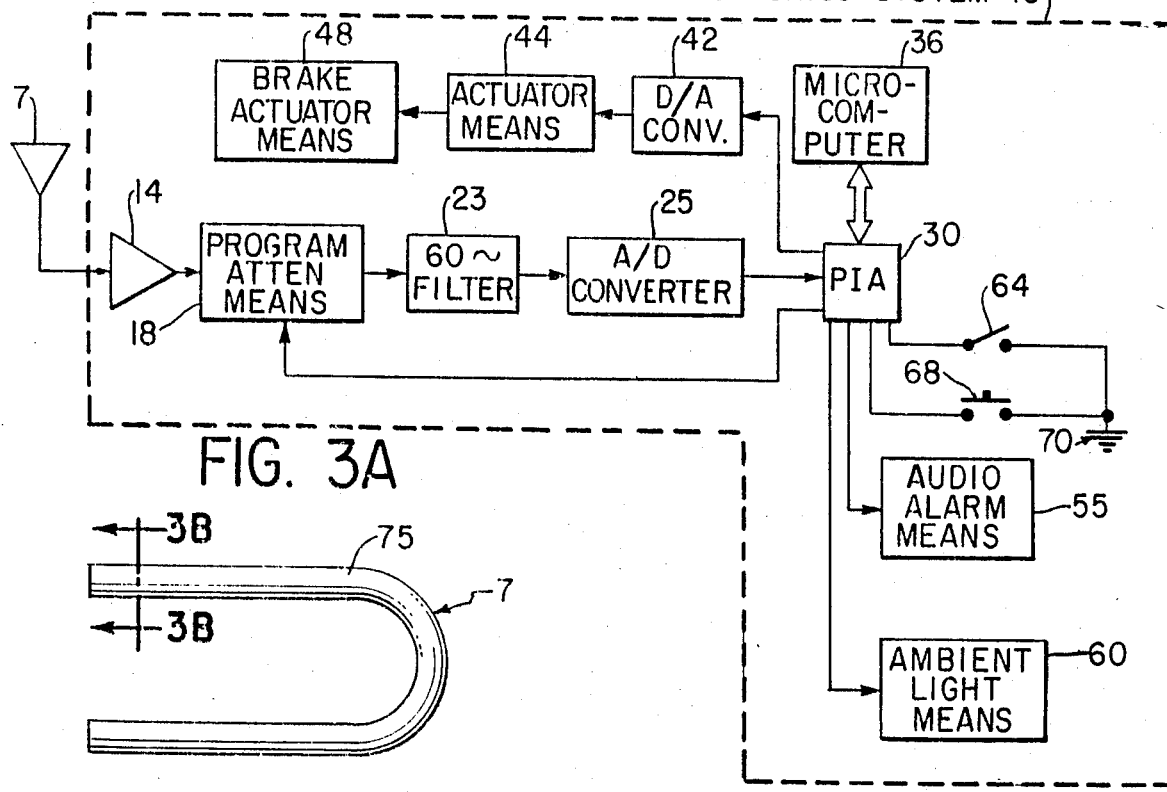
FIG. 2 is a simplified block diagram of the safety system shown in FIG. 1.

Referring now to FIG. 2, antenna 7 when in the presence of an electric field, provides a signal to an amplifier 14 of electronic system 10 which amplifies the signal and provides it to a programmable attenuator 18. Programmable attenuator 18 permits the use of the present invention over a wide dynamic range of voltages from less than a hundred volts up into the thousands of volts while using conventional digital devices. An attenuated signal is provided by programmable attenuator 18 to 60 cycle bandpass filter 23, which in turn provides a filtered signal to an analog-to-digital converter 25. The digitzed signals representative of the electric field are provided to the peripheral interface adapter 30 which may be of the type manufactured by Motorola as their part number MC 6821 L. Adapter 30 provides digital signals to a microcomputer 36 and receives signals from microcomputer 36. Microcomputer 36 includes a microprocessor and an erasable programmable read only memory.

Microcomputer 36 compares the digital signals representative of the electric field with a reference signal, derived in a manner hereinafter described, representative of a saftey limit for the electric field. Microcomputer 36 provides digital brake signals to adapter 30 when the electric field exceeds the safety limit. Adapter 36 provides the digital brake signals to a digital-to-analog converter 42 which in turn provides an analog brake signal to actuator means 44, which is part of the conventional raising means of truck 1. Actuator means provides the analog brake signal to brake actuator means 48 which is also part of the conventional apparatus associated with truck 1. The occurrence of a brake signal will cause truck 1 operator from raising derrick by deactivating the raising apparatus and by braking the movement of derrick 3.

Adapter 30 will also provide signals at the appropriate time to audio alarm means 55 and to ambient light means 60. Two switches 64 and 68 are connected between adapter 30 and ground 70. Switch 64 is an on-off type of single pole-single throw switch that is activated when derrick 3 leaves its cradle during the erecting process. Switch 64 is used to set a reference voltage while switch 68 is a momentary on type of button used as an alarm acknowledge which disables alarm means 55.

When derrick 3 is lowered to its rest position, the program in microcomputer 36 resets itself.

When the signal provided by antenna 7 is greater than a preset value, which may by way of example be 10 millivolts at the moment the set reference switch 64 is being released, the digital signal representative of this AC signal is considered as a reference signal. Otherwise the reference signal is the digital signal representative of first AC signal which exceeds the preset value during the rise of derrick 3.

Microcomputer 36 also determines the reference signal which is the absolute voltage at antenna 7 at the time switch 64 is activated. Microcomputer 36 determines the absolute voltage at antenna 7 by the following equation $$Va = (1/Ga) \cdot [10^{(0.375N/20)}] \cdot (1/Gf) \cdot Vo \cdot C.$$

where $Va$ is the absolute peak voltage at antenna 7, $Ga$ is the predetermined gain of antenna 7 and amplifier 14, $N$ is the known attenuation factor of programmable attenuator means 18, $Gf$ is the predetermined gain of filter 23, $Vo$ is the output of A/D converter 25 in bits and $C$ is a conversion factor for A/D converter 25 in millivolts per bit. Microcomputer 36 also effectively averages the peaks of the signal from antenna 7 over several cycles. This may be done by averaging $Vo$ and hence $Va$, or by averaging $Va$ directly.

While switch 64 is not activated, microcomputer 36 constantly calculates the voltage $Va$, adjusting the attenuation factor $N$ in accordance with the peak values of voltage $Va$ so that $Vo$ is between 35% and 45% of the full scale of A/D converter 25. The attenuation factor $N$, is a non-linear function, which is retrieved from a look up table preprogrammed in the erasable programmable memory of microcomputer 36.

When switch 64 is activated, microcomputer 36 saves the current value of $Va$ as a reference voltage. Microcomputer 36 also controls programmable attenuator means 18 to maintain attenuation factor to its current level. At this time microcomputer 36 constantly calcualates the value of $Va$, without adjusting $N$, and compares it to the reference voltage. An alarm condition will occur when the ambient voltage $Va$ becomes more than twice the value of the reference voltage.

The purpose of the attenuation factor $N$ and the gain $GA$ is to increase the dynamic range of signals from the antenna to microcomputer 36. Each antenna has a unique gain associated with it. With a single resistor, $GA$ can be adjusted to match the AC Power Line Monitor with different antennas. Furthermore, different locations have differing levels of ambient fields. The attenuation factor $N$ allows a good reference to be set at a low ambient voltage level as well as at a high one.

When the current AC signal is over the alarm level, adapter 30 provides signals to audio alarm 55 and to ambient light means 60 to warn the operator that derrick 3 is approaching a hazardous voltage source. The operator upon investigation may then decide that derrick 3 can be safely raised to its intended position. The operator can shut off alarm means 55 by activation of switch 68.

Figure 3A:
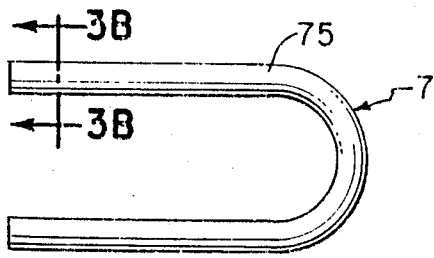
FIGS. 3A and 3B depict an antenna which may be used with the present invention.
Figure 3B:
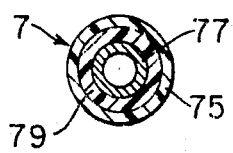

With reference to FIGS. 3A and 3B, there is shown a preferred 7 which is made of a PVC pipe 75, bent to the shape shown in FIG. 3A, having inside of it a ⅜ inch flexible metal conduit 77, potted in place with an epoxy 79.

The system of the present invention is a safety monitor for use with a structural member that is conductive which will be raised to a positon in a location where the proximity of electrical conductors would create hazardous conditions for an operator raising the structural member.

What is claimed is:

1. An automatic safety monitor for use with apparatus having a conductive member, said apparatus changes the attitude and/or altitude of the conductive member during operation of the apparatus, comprising:

antenna means mounted on the conductive member for sensing an electric field and providing an AC signal representative of the strength of the electric field, means for averaging the peaks of the AC signal over several cycles to provide an average peak signal, means connected to the averaging means for providing a reference signal derived from either the average peak signal prior to a change in the member's attitude and/or altitude or while the apparatus is changing the member's attitude and/or altitude, and alarm means connected to said averaging means and to the reference signal means for providing an alarm to the operator of apparatus so that the operator may prevent further changing of the conductive member's attitude and/or altitude, said alarm means provides said alarm in accordance with the average peak signal and the reference signal when the electric field strength is substantially greater than a safe value.

2. A monitor as described in claim 1 in which the antenna includes:

a hard plastic tubing formed in a predetermined manner, flexible metal tubing located within the plastic tubing, and means for maintaining the metal tubing within the plastic tubing in a predetermined spatial relationship.

3. A monitor as described in claim 2 in which the alarm means includes:

audio means for providing an audio alarm when activated, light means for providing a visual alarm when activated, and activating means responsive to the average peak signal and to the reference signal for activating the audio means and the light means when the level of the average peak signal is twice that of the level of the reference signal.

4. A monitor as described in claim 3 in which the averaging means, the reference signal means and the activating means are embodied in a preprogrammed microcomputer; and further comprising:

an analog-to-digital converter that converts the AC signal to digital signals which are provided to the microcomputer.

5. A monitor as described in claim 4 in which the microcomputer includes means for resetting the monitor when the member is again in its initial attitude and/or altitutude.

6. A monitor as described in claim 5 which further comprises:

programmable attenuating means connected to the antenna means for attenuating the AC signal from the antenna to provide a corresponding signal that lies within the full range capabilities of the microprocessor and the analog-to-digital converter, filter means connected between the attenuating means and the analog-to-digital converter for filtering the signal from the attenuating means so as to provide a signal to the analog-to-digital converter having a frequency associated with the electric field.

7. A monitor as described in claim 6 in which the antenna means is a single antenna located at one end of the member which will be elevated during the changing of the attitude and/or altitude of the member.

8. A monitor as described in claim 6 in which the antenna means is a group of antennas located on the member.

9. A method for safely changing the attitude and/or altitude of a conductive member in the vicinity of a power line comprising the steps of:

providing an AC signal when the conductive member is in the presence of an electric field which is representative of the strength of the electric field, averaging the peak of an AC signal when it occurs to provide an average peak signal, providing a reference signal derived from the average signal prior to a change in the member's attitude and/or altitude or while the apparatus is changing the member's attitude and/or altitude, and moving the conductive member until either it arrives at a desired attitude and/or altitude for the conductive member or an average peak signal is provided which in cooperation with the reference signal indicates that the conductive member has entered an electric field whose strength is greater than a safe value.

10. A method as described in claim 9 further comprising:

providing an alarm when the average peak signal level is greater than the reference signal level.

11. A method as described in claim 10 in which the alarm is both audible and visible.

12. A method as described in claim 11 in which the alarm is provided when the level of the average peak signal is dobule the level of the reference signal.

* * * * *